United States Patent [19]

Gohda et al.

[11] Patent Number: 4,499,509
[45] Date of Patent: Feb. 12, 1985

[54] TAPE POSITION CONTROL APPARATUS

[75] Inventors: Seiichi Gohda; Mamoru Ishiguro, both of Kanagawa, Japan

[73] Assignee: Sony Corporation, Tokyo, Japan

[21] Appl. No.: 349,155

[22] Filed: Feb. 16, 1982

Related U.S. Application Data

[63] Continuation of Ser. No. 132,885, Mar. 24, 1980, abandoned.

[30] Foreign Application Priority Data

Mar. 29, 1979 [JP] Japan ................... 54-37429

[51] Int. Cl.$^3$ ............................................. H04N 5/782
[52] U.S. Cl. ...................... 360/72.1; 369/30
[58] Field of Search ............ 360/72.2, 14.1, 14.2, 360/14.3, 71, 72.1; 369/19, 30, 32; 358/310, 335

[56] References Cited

U.S. PATENT DOCUMENTS

| 3,721,757 | 3/1973 | Ettlinger | 360/14.3 |
|---|---|---|---|
| 3,851,116 | 11/1974 | Cannon . | |
| 3,987,484 | 10/1976 | Bosche et al. | 360/33.1 |
| 4,120,006 | 10/1978 | Nagami et al. | 360/72 |
| 4,193,120 | 3/1980 | Yello | 364/900 |
| 4,200,893 | 4/1980 | Matison | 360/72.1 |
| 4,210,785 | 7/1980 | Huber et al. . | |
| 4,210,940 | 7/1980 | Prysby et al. | 360/33.1 |
| 4,214,282 | 7/1980 | Sato et al. | 360/69 |
| 4,225,890 | 9/1980 | Takenaka et al. | 360/72.1 |
| 4,237,497 | 12/1980 | Trevithick | 360/72.1 |
| 4,237,498 | 12/1980 | van Eijck et al. | 360/72.2 |

FOREIGN PATENT DOCUMENTS 899118 6/1962 United Kingdom .
1491153 11/1977 United Kingdom .

Primary Examiner—Donald E. McElheny, Jr.
Attorney, Agent, or Firm—Hill, Van Santen, Steadman & Simpson

[57] ABSTRACT

A tape position control apparatus for video tape recorders is mainly composed of a tape control device which functions to control the movement of a video tape, a count circuit for counting the number of control pulses reproduced from the video tape, a segment data memory for storing segment data indicating the number of control pulses from the tape for the top or beginning of each segmented video information which is recorded on the video tape with reference to segment number of the segmented video information, an input device for requesting to search one of the segmented video information by generating a segment number, a comparison circuit for comparing currently counted number stored in the count circuit with the top segment data for the requested segment number, and a command signal generating circuit for generating command signals to be supplied to the tape drive control circuit in order to search for the top of the requested video information.

6 Claims, 14 Drawing Figures

DATA LOAD ROUTINE

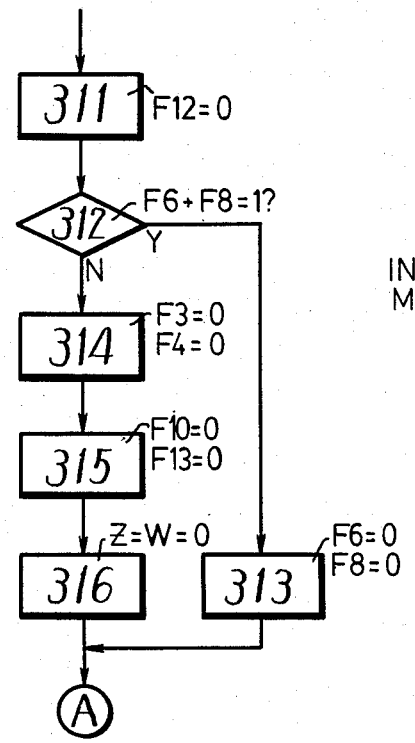
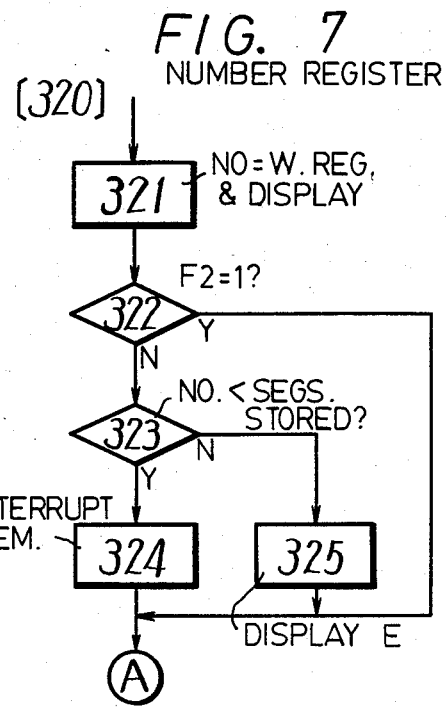
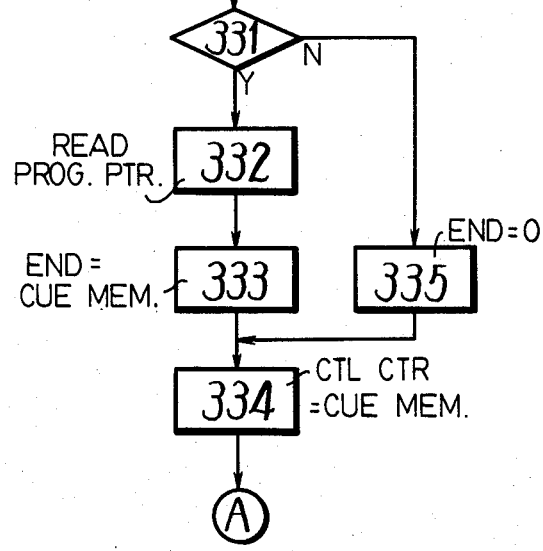

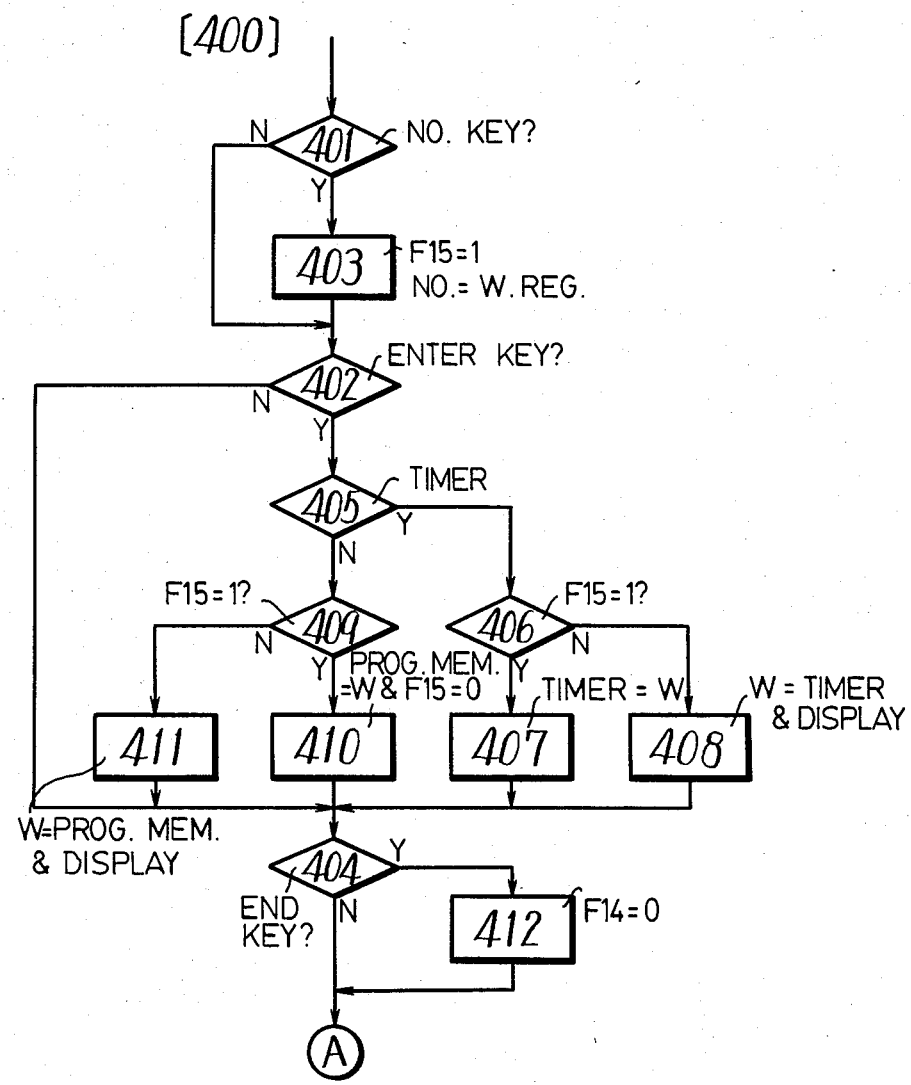

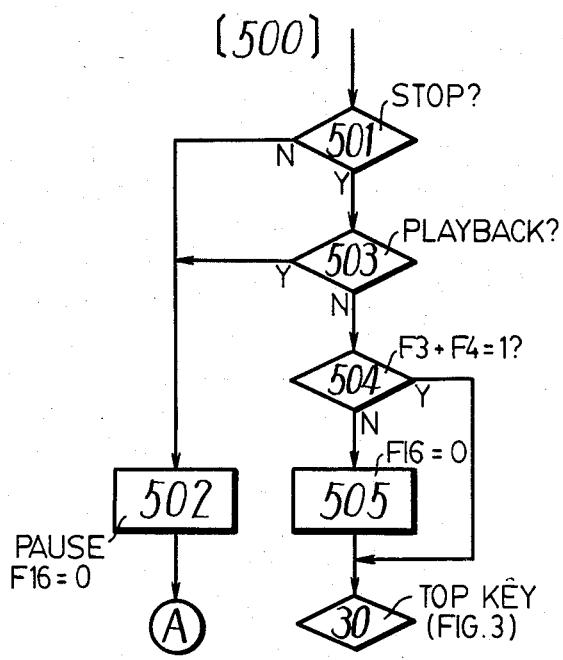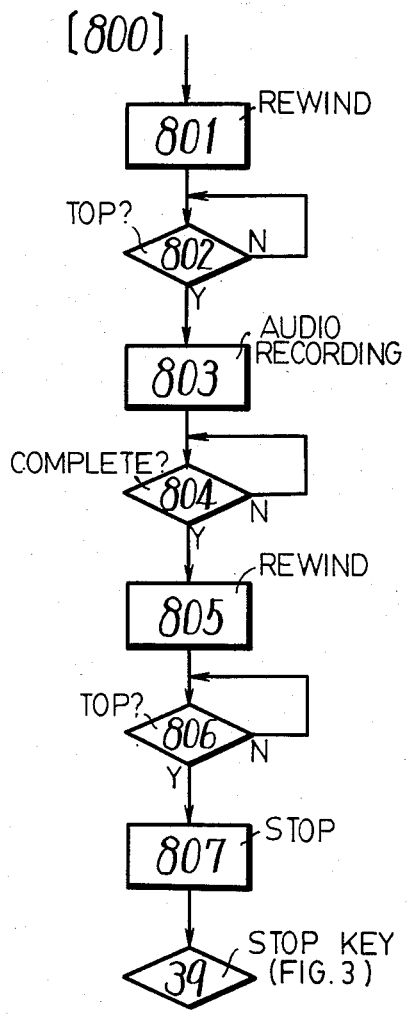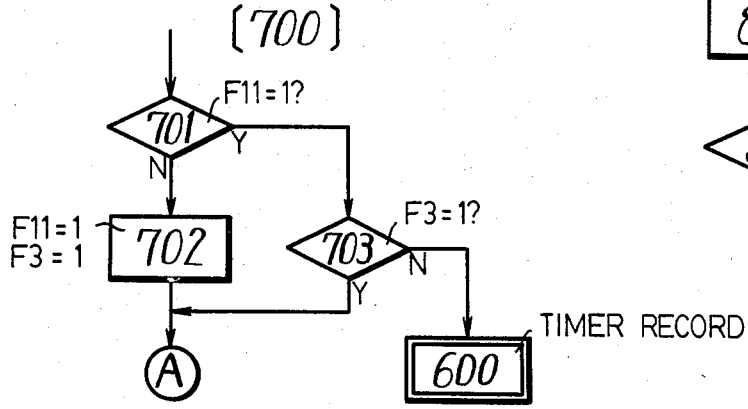

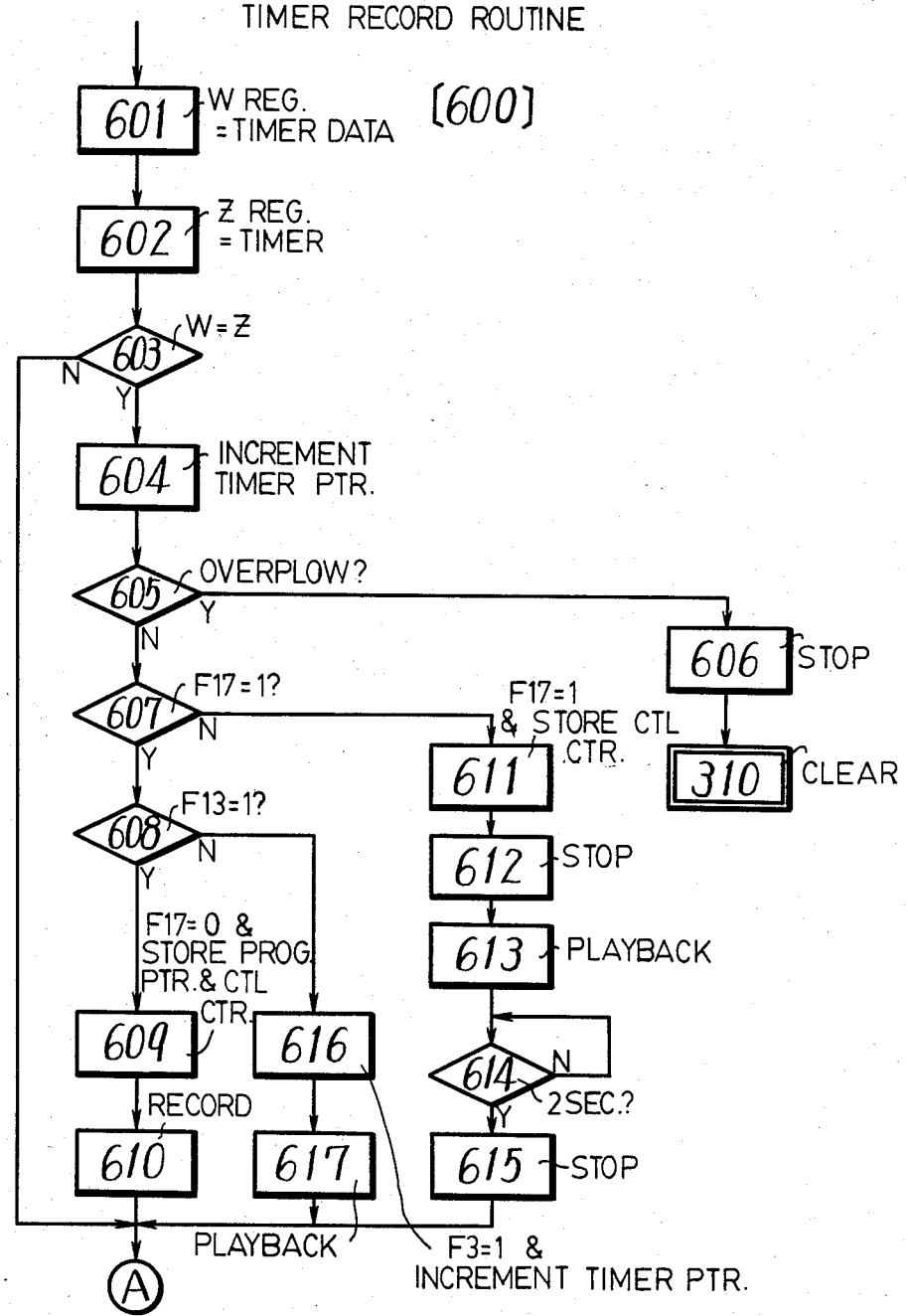

TAPE POSITION CONTROL APPARATUS

This is a continuation of application Ser. No. 132,885, filed 3/24/80, now abandoned.

BACKGROUND OF THE INVENTION

1. Field of the Invention

This invention relates to an automatic tape position control apparatus, and particularly to such apparatus that is applied to a video tape recorder for recording video information together with control signals on one side of a video tape.

2. Description of the Prior Art

There has been proposed an automatic tape position control apparatus, wherein the requested tape position is accessed by counting control track (CTL) pulses from a tape top or beginning.

In such apparatus, the number of the CTL pulses from the tape top to the desired tape position has to be entered. However, such number is relatively large value, so that the entry of such CTL number is very troublesome.

Further, such apparatus has no programmed functions, so that the entry of the CTL number has to be done every time when the playback is carried out from different positions in sequence.

SUMMARY OF THE INVENTION

According to this invention, information recorded on the video tape is divided into plural segments.

The CTL numbers at the top (or beginning) and end of each segment are measured from the tape top and memorized in a memory together with the segment number. This apparatus employs a micro processor, and by the entry of the segment number an operator can play back the desired information from the video tape.

Such data, namely segment numbers and associated CTL numbers are recorded on an audio track at the tape top. In the disclosed embodiment, recorded information can be divided into 63 segments at maximum and such data are memorized in a segment data memory in order with counted CTL values.

There is also provided a program memory for eight segments. By the entry of an optional segment number according to a desired playback order, corresponding segment data are read from the segment data memory and memorized in the program memory at its respective addresses in accordance with an entry order.

In a search mode playback, first segment data assigned by the program memory are firstly read and the above segment is accessed to start the playback. Then, upon finishing this segment playback, the tape is stopped. At the same time, segment data secondly assigned by the program memory are read and this segment is accessed to resume the playback. This operation is repeated in an order requested by eight segments of the program memory, and when the playback of the eighth segment is finished, the tape comes to its stop mode.

Next, in a repeat mode playback, the same operation is carried out as in the search mode playback, and upon completing the playback of the eighth segment, an operation is again repeated from the first assigned segment.

When a cue key is pressed during the search mode playback or repeat mode playback, a counted CTL pulse value at that point (cue point) and segment end data of the reproduced segment are memorized in a cue memory. Then, when a search key is pressed at an optional time point, data in the cue memory (cue data) are read and the cue point is accessed to start the playback from the cue point. Then, when this playback comes to the segment end or a clear key is pressed, the playback is stopped, and the segment data of the program memory, which are being reproduced when the search key is pressed, are again read. Then, the above segment is accessed and the playback is resumed.

If the search key is pressed after the designation of an optional segment number during the search mode playback or repeat mode playback, the segment data corresponding to the designated segment number are read from the segment memory, and this segment is accessed to start the playback as an interruption search mode. When this playback reaches the segment end or the clear key is pressed, the original segment is accessed to reopen the playback as in the cue mode operation.

Further, when a fast-forward key is pressed during the search mode playback or repeat mode playback, a normal fast-forward condition is presented. At the same time, when the tape reaches the segment and by this fast forward operation, segment data at the next address of the program memory are read, and this segment is accessed at its top and reproduced.

When a rewind key is pressed during the search mode playback or repeat mode playback, a normal rewind condition is presented. At the same time, when this rewind comes to the segment top, the playback is again started therefrom.

As described previously, segment data for 63 segments can be recorded on an audio track at the tape top. In other words, each of segment data for the maximum 63 segments is coded by audio frequency for being recorded.

Accordingly, when a video cassette recorded with segment data at the tape top is installed in a machine, a video tape of the video cassette is automatically rewound and the tape top is accessed.

Thereafter, the machine is put into a playback mode, and the segment data recorded are reproduced and stored in the segment data memory of the control apparatus. After the load of the segment data is completed, the tape is again rewound to the tape top.

Next, in the CTL pulses at the boundary of segments on the tape there are provided a 2-second blank portion, or blank portion for 60 CTL pulses. Then, when the playback reaches the segment end, this blank portion is detected, and at the detected time point a counted CTL pulse value of the CTL counter is replaced by end segment data of the segment memory. Accordingly, an error in the counted values due to dropout or the like in this system is corrected.

Further, clock signals are counted and time counting in a timer mode is carried out. To this end, there is provided a timer memory of 16 addresses, in which every two addresses are paired and the start times and stop times of timer operation (timer data) are memorized.

In the timer record mode, timer data (start) at the first address of the timer memory are firstly read. When the above data coincide with a value of timer clock, the recording mode is presented. At the same time, currently counted CTL pulse value is stored in the program memory at its segment top of the first address. After turning to the recording mode, when timer data (stop) in the timer memory at its second address are read and the above data coincide with the value of timer clock, the stop mode is presented. At the same time, currently counted CTL pulse value is stored in the program memory at its segment end of the first address. This operation is carried out in turn at sixteen addresses of the timer memory, that is, timer record for eight segments is carried out. Thus, counted CTL pulse values at the top and end of each time are memorized in order in the program memory.

Further, in the timer play mode, operation start times are memorized in the timer memory at its respective odd-numbered addresses, and segment data reproduced are memorized in the program memory. Then, in operation, at first the search mode is presented and the first segment is accessed to exhibit the stop mode. After that, when timer data in the timer memory at its first address are read and the above data are coincident with the value of timer clock, the playback is started. Further, when the playback comes to the segment end, the second segment is accessed to exhibit the stop mode. At the same time, timer data of the timer memory at its third address are read out. This operation is carried out in order at eight addresses of the program memory and at respective odd-numbered addresses of the timer memory, so that the timer play is carried out eight times.

BRIEF DESCRIPTION OF THE DRAWINGS

FIG. 3 to FIG. 13, inclusive, are flow charts showing respective programs stored in a read-only memory of this invention.

DESCRIPTION OF THE PREFERRED EMBODIMENT

A description will hereinafter be given on one example of a tape position control apparatus of this invention with reference to the drawings.

Figure 1:
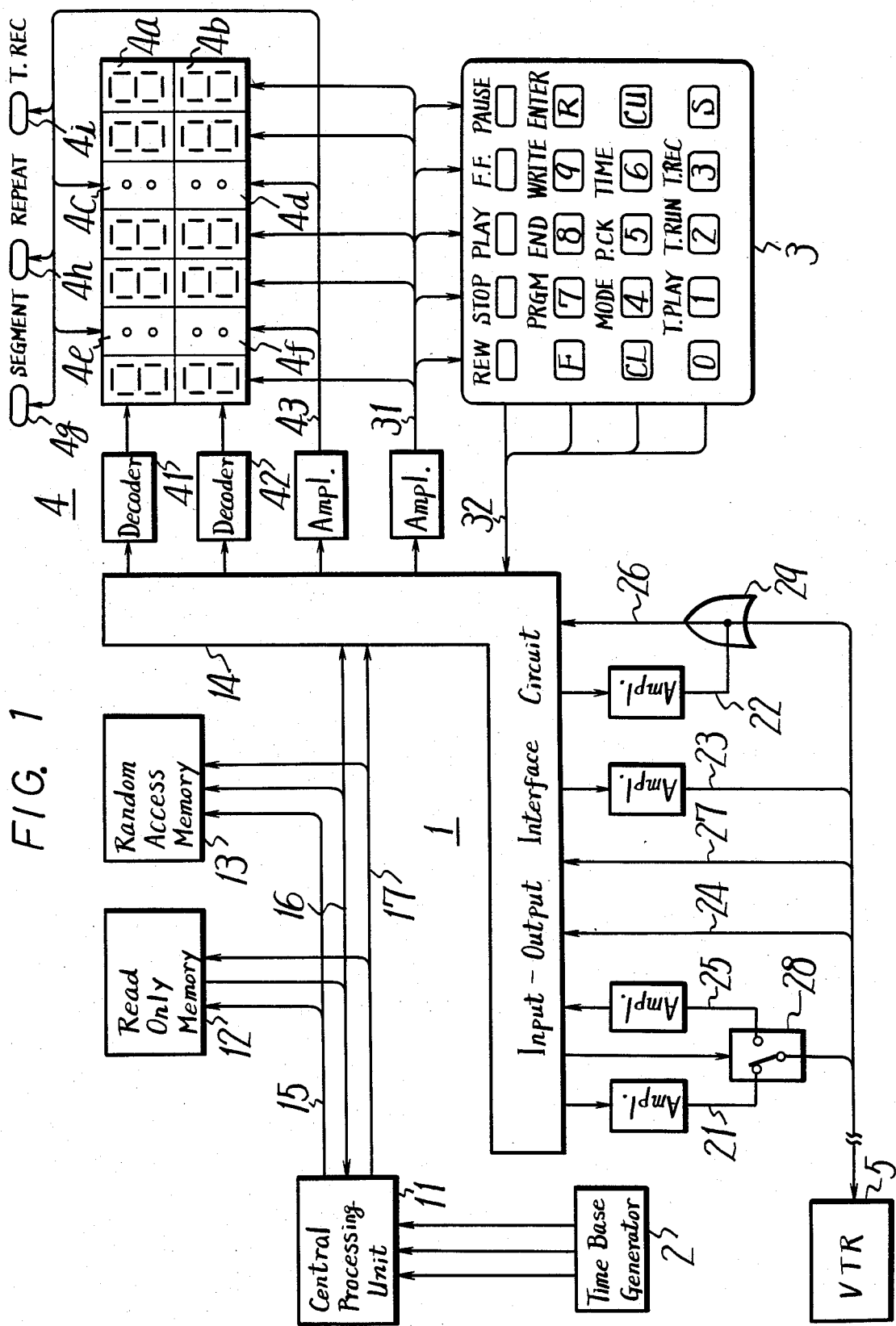
FIG. 1 is a systematic view showing one example of a tape position control apparatus according to this invention.

FIG. 1 shows a fundamental construction of the tape position control apparatus according to this invention. In this invention, a video tape recorder (VTR) to be controlled is of 2-head helical scan type and hence the frequency of CTL pulses is 30 Hz at a normal playback speed. In this embodiment, the apparatus is incorporated in a remote control box of the cassette-type VTR.

In FIG. 1, reference numeral 1 designates a tape position control circuit which functions to control a program using a so-called micro-processor and is composed of a central processing unit (CPU) 11, a read-only memory (ROM) 12 written with an operation program of the CPU 11 or the like, a random access memory (RAM) 13 for memorizing data or the like, an input-output interface circuit 14, and the like. The CPU 11 is connected to the ROM 12 and to the RAM 13 respectively through address bus line 15, data bus line 16 and control bus line 17. The CPU 11 is also connected to the input-output interface circuit 14 through the data bus line 16 and control bus line 17. These elements are preferably constructed as a 1-chip large scale integration (LSI).

The CPU 11 is also connected to a time base generator 2, while the input-output interface circuit 14 is connected to a keyboard 3 and to a display 4.

The keyboard 3 consists of twenty keys, numeral keys and functional keys, as shown in FIG. 1. These keys are connected to a 5×4 matrix, in which 5-phase clock signals are supplied from the input-output interface circuit 14 through line 31 to each column and a signal obtained at each row by key operation is supplied through line 32 to the input-output interface circuit 14.

The display 4 is composed of two 5-digit numeral displays 4a and 4b. The display 4a includes colon display units 4c, 4e at every third digit from the lowest one and the display 4b includes colon display units 4d, 4f, similarly. In addition, the display 4 is provided with three functional displays 4g, 4h, 4i. The numeral displays 4a, 4b are respectively fed at each digit with the same 5-phase clock signals as those fed to the column lines of the keyboard 3 and also fed at each numeral display with data signals from the input-output interface circuit 14 through decoder circuits 41, 42. As a result, each numeral is displayed on the numeral displays 4a, 4b in a time-sharing manner. The respective colon display units 4c to 4f and functional display units 4g to 4i are supplied with control signals from the input-output interface circuit 14 through line 43.

The input-output interface circuit 14 is further connected to a VTR 5. Between the circuit 14 and VTR 5 there are provided the following connection lines.

The input-output interface circuit 14 is adapted to supply the VTR 5 with audio channel signals through line 21, function control signals of tape movement (stop or move, rewind and fast forward) through line 22, and audio dubbing control signals, recording control signals, pause control signals, etc. through line 23, respectively. While, the VTR 5 is adapted to supply the input-output interface circuit 14 with CTL signals through line 24, audio channel signals through line 25, tape movement condition indicating signals through line 26, and a cassette installation indicating signal, remote control inhibit indicating signal, signal for displaying tape rewind to its top, etc. through line 27. Among these lines, the lines 21, 25 for audio channel signals can be both replaced by a single lead wire owing to the use of a switch circuit 28. Also, the lines 22, 26 are both replaced by a single lead wire owing to the use of a coupling circuit 29.

Figure 2:
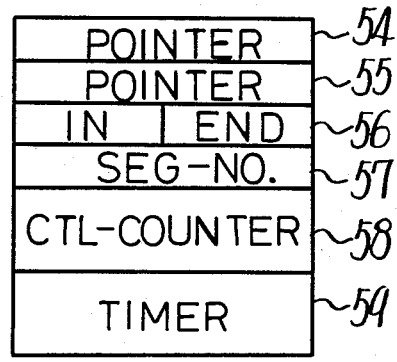
FIG. 2 is a view showing the contents of a random access memory and other registers thereof used in this invention.

FIG. 2 shows the contents of the RAM 13 and other registers included therein. In FIG. 2, reference numeral 51 designates a segment data memory area in which sixth-three (63) addresses are provided to store sixty-three items of segment data. Reference numeral 52 designates a program memory area in which eight addresses are provided to store eight segment numbers and 53 a timer memory area in which sixteen addresses are provided to store sixteen items of timer data (for eight times). A program pointer 54 is composed of 4-bit register and adapted to store a numeral indicating an optional address of the program memory area 52. A timer pointer 55 is composed of a 4-bit register and adapted to store a numeral indicating an optional address of the timer memory area 53. A cue memory 56 is provided with one address and adapted to store cue data. An interruption memory 57 is stored with segment numbers designated by interruption search. A CTL counter 58 is adapted to count CTL pulses, and a timer counter 59 is to count standard clock pulses. In addition, there are provided working registers used in calculation, various kinds of flag registers and the like, which are enumerated in the following table.

TABLE

| | | | |
|---|---|---|---|
| Cassette | $F_1$ | Clear | $F_{12}$ |
| CTL | $F_2$ | Timer Record | $F_{13}$ |
| Search | $F_3$ | Program | $F_{14}$ |
| Repeat | $F_4$ | Number In | $F_{15}$ |
| Search Stop | $F_5$ | Pause | $F_{16}$ |
| Cue Search | $F_6$ | Timer Top | $F_{17}$ |
| Top | $F_7$ | Working Register | W |
| Interruption Search | $F_8$ | Register | Z |
| Search Play | $F_9$ | Register | A |
| Timer Play | $F_{10}$ | Register | T |
| Search On | $F_{11}$ | | |

In the ROM 12 there are stored the following programs, which will be hereinafter described with reference to a flow chart of FIG. 3. In this chart, each pair of same alphabetical symbols are to be interconnected therebetween (A—A, B—B, . . . ).

Figure 3:
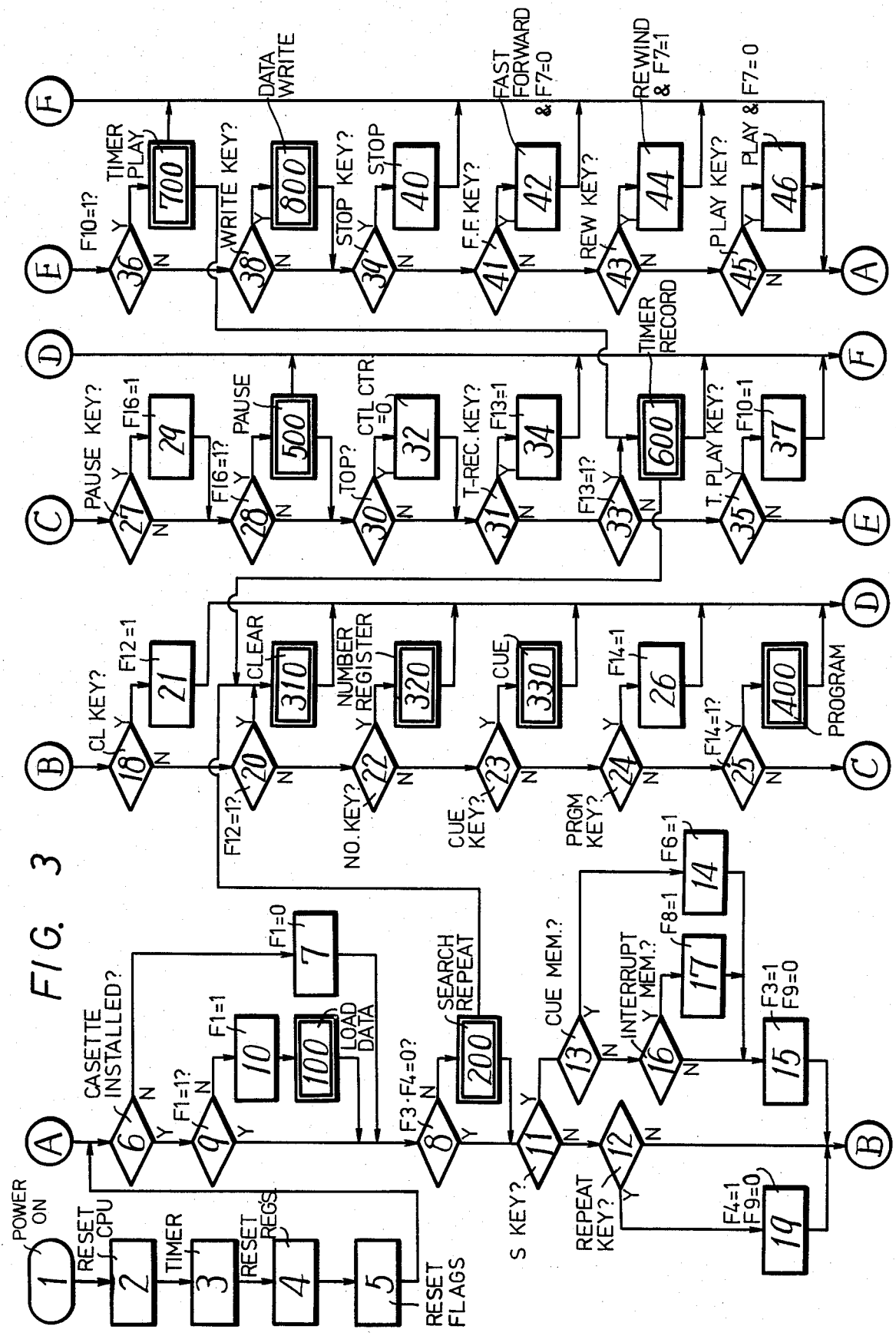

In FIG. 3, when a power switch is turned on at step "1", the CPU 11 and the like are reset at step "2" and warm-up time (2.5 seconds) of the VTR 5 is given at step "3". Then, at step "4" the counters 58, 59 of the RAM 13 are reset to zero and at step "5" the flag registers and the like of the RAM 13 are preset to the initial condition.

Next, at step "6" a decision is made whether or not the VTR 5 has been installed with a video tape cassette. When not installed, the cassette flag $F_1$ is made zero at step "7" and an advance is made to step "8". While, when installed, at step "9" a decision is made whether or not the cassette flag $F_1$ is one (1). When the flag $F_1$ is one, an advance is made to the step "8". However, when the flag $F_1$ is zero, at step "10" the cassette flag $F_1$ is turned to one and at step "100" a DATA LOAD ROUTINE is effected.

Figure 4:
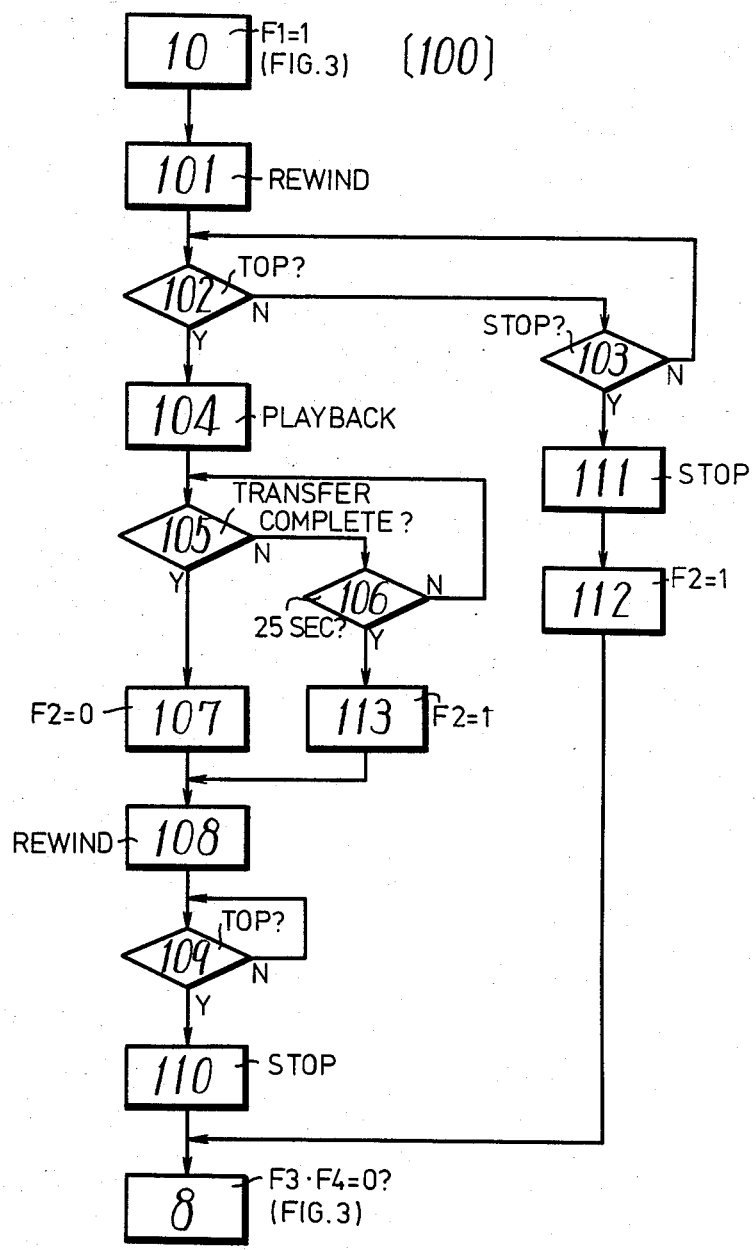

The data load routine at the step "100" is programmed as shown by a flow chart of FIG. 4. That is, at step "101" the VTR 5 is turned to its rewind mode. Then, at step "102" a decision is carried out whether or not a tape reaches its top or beginning position. When the tape does not reach the top position, another decision is carried out at step "103" whether or not the button STOP of the VTR 5 is pressed. When the button STOP is not pressed, a return is made to the step "102" to repeat the above operation.

On the other hand, when it is recognized at the step "102" that the tape has reached its top position, at step "104" the VTR 5 is turned to its playback mode so that segment data recorded on the audio track at the tape top are reproduced and transferred to the segment memory 51 of the RAM 13.

Figure 14:
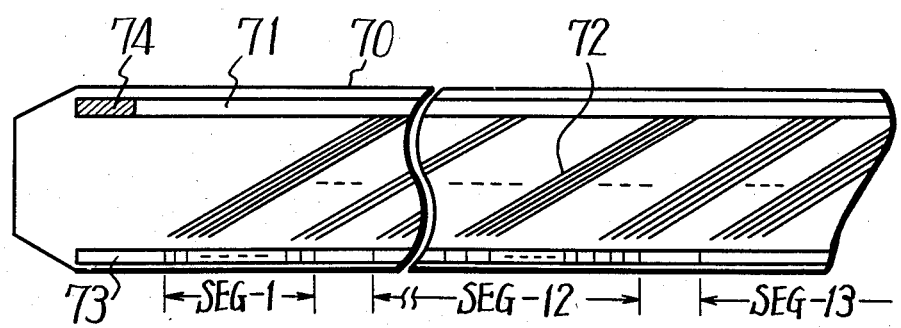
FIG. 14 is a schematic view used for explaining the tape format according to this invention.

Now, a tape format will be described with reference to FIG. 14. As well known, a video tape 70 is recorded with an audio track 71, slant video tracks 72 and a CTL track 73. When the VTR 5 to be used is of 2-head helical scan type, by way of example, a single video track 72 contains one field of video information, and CTL pulses are recorded on the CTL track at 30 Hz in case of the NTSC television system. In FIG. 14, the left end corresponds to the tape top and segment data 74 are recorded on the audio track 71 of the tape top. The video tape 70 is divided into a plurality of segments SEG-1, SEG-2, . . . according to the contents to be recorded.

Again, turning to the description of the flow chart of FIG. 4, a further decision is carried out at step "105" whether or not the data have been completely transferred. When the transfer of data is not completed, another decision is made at step "106" whether or not a time of 25 seconds has lapsed from the start of playback.

Then, when 25 seconds have not yet been lapsed from the playback start and the data transfer is not completed, a return is made to the step "105" to repeat the above operation.

When it is confirmed at the step "105" that the data transfer has been finished, the whole apparatus is turned to a segment data control mode at step "107" and the CTL flag $F_2$ is made zero. Then, at step "108" the VTR 5 is again turned to its rewind mode.

Next, at step "109" a decision is carried out whether or not the tape has been rewound to its top point. When the above rewind is not finished, a return is made to the step "109" to repeat the above operation. While, when the rewind has been finished, at step "110" the VTR 5 is turned to its stop mode and an advance is effected to the step "8" of FIG. 3.

Further, when it is confirmed at the step "103" that the button STOP of the VTR 5 is pressed, at step "111" the VTR 5 is turned to its stop mode and at step "112" the whole apparatus is turned to the prior art CTL number control mode so that the CTL flag $F_2$ is turned to one and an advance is made to the step "8" of FIG. 3.

At the step "106", when 25 seconds have been passed, predetermined data are not recorded on the tape top. In this case, at step "113" the whole apparatus is turned to the CTL number control mode so that the CTL flag $F_2$ is made one and the flow is advanced to the step "108". Then, the tape is rewound to its top point so that it comes to its stop mode and an advance is made to the step "8" of FIG. 3.

The DATA LOAD ROUTINE is thus carried out at the step "100" in a manner as described above.

Next, at the step "8" a decision is carried out whether or not the search flag $F_3$ or the repeat flag $F_4$ is zero. When both the flags $F_3$, $F_4$ are zero, an advance is made to step "11". On the other hand, when either one of the flags $F_3$, $F_4$ is one, a SEARCH-REPEAT ROUTINE is carried out at step "200".

Figure 5:
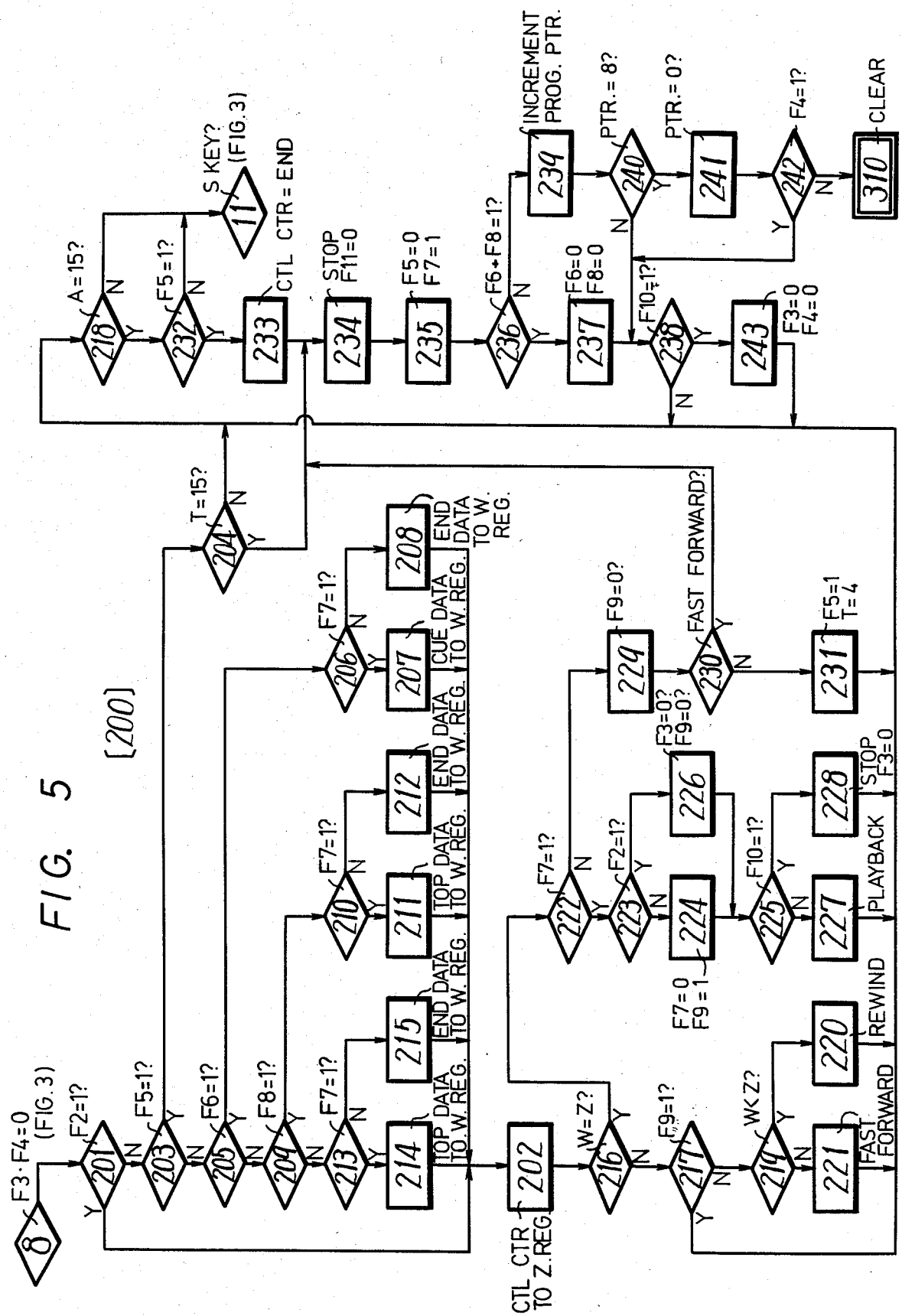

The SEARCH-REPEAT ROUTINE at the step "200" is programmed as shown by a flow chart of FIG. 5. That is, at step "201" a decision is effected whether or not the CTL flag $F_2$ is one, and when the flag $F_2$ is one, the flow is advanced to step "202". While, when the flag $F_2$ is zero, another decision is carried out at step "203" whether or not the search stop flag $F_5$ is one, and when the flag $F_5$ is one, an advance is made to step "204".

When the flag $F_5$ is zero, a decision is made at step "205" whether or not the cue search flag $F_6$ is one, and when the flag $F_6$ is one, a further decision is carried out at step "206" whether or not the top flag $F_7$ is one. Then, when the flag $F_7$ is one, at step "207" cue-in segment data of the cue memory 56 are transferred to the working register W of the calculation section and an advance is made to the step "202". When the flag $F_7$ is zero, at step "208" end segment data of the cue memory 56 are transferred to the working register W and an advance is effected to the step "202".

Further, when the flag $F_6$ is zero at the step "205", a decision is carried out at step "209" whether or not the interruption search flag $F_8$ is one, and when the flag $F_8$ is one, another decision is carried out at step "210" whether or not the top flag $F_7$ is one. Then, when the flag $F_7$ is one, at step "211" top segment data of the segment data memory 51 at its address designated by the interruption memory 57 are transferred to the working register W and an advance is made to the step "202".

When the flag $F_7$ is zero, at step "212" end segment data of the segment data memory 51 at its address designated by the interruption memory 57 is transferred to the working register W and an advance is made to the step "202".

When the flag $F_8$ is zero at the step "209", a decision is carried out at step "213" whether or not the top flag $F_7$ is one. When the flag $F_7$ is one, top segment data of the program memory 52 at its address designated by the program pointer 54 is transferred to the working register W at step "214" and then an advance is effected to the step "202". While, when the flag $F_7$ is zero, end segment data of the program memory 52 at its address designated by the program pointer 54 is transferred to the working register W at step "215" and an advance is made to the step "202".

Next, at the step "202" the counted value of the CTL counter 58 is transferred to the register Z, and at step "216" a decision is carried out whether or not the content of the working register W coincides with the content of the register Z. As a result, when they are not coincident to each other, another decision is carried out at step "217" whether or not the search play flag $F_9$ is one, and if the flag $F_9$ is one, the flow is advanced to step "218". When the flag $F_9$ is zero at the step "217", the content of the working register W is compared with the content of the register Z at step "219". When the content of the register Z is larger than that of the working register W, at step "220" the VTR 5 is turned to its rewind mode and an advance is made to the step "218". While, if the content of the register Z is smaller than that of the working register W, at step "221" the VTR 5 is turned to its fast forward mode and an advance is made to the step "218".

At the step "216", when the content of the working register W is coincident with the content of the register Z, a decision is carried out at step "222" whether or not the top flag $F_7$ is one. Then, when the flag $F_7$ is one, a further decision is made at step "223" whether or not the CTL flag $F_2$ is one. When the flag $F_2$ is zero, at step "224" the top flag $F_7$ is turned to zero and the search play flag $F_9$ is turned to one. Then, an advance is made to step "225". Meanwhile, when the CTL flag $F_2$ is one at the step "223", the search flag $F_3$ is turned to zero and the search play flag $F_9$ is turned to zero at step "226". Then, an advance is made to the step "225".

At the step "225", another decision is performed whether or not the timer play flag $F_{10}$ is one. Then, when the flag $F_{10}$ is zero, the VTR 5 is turned to its playback mode at step "227" and an advance is made to step "218". When the flag $F_{10}$ is one, at step "228" the VTR 5 is turned to its stop mode and the search flag $F_3$ is turned to zero. Then, the flow is advanced to the step "218".

When the top flag $F_7$ is zero at the step "222", the search play flag $F_9$ is turned to zero at step "229" and a decision is carried out at step "230" whether or not the VTR 5 is in its fast forward mode. When it is not in the fast forward mode, at step "231" the search stop flag $F_5$ is turned to one and numeral four (4) is set in the register T. Then, the flow is advanced to the step "218".

Further, at the step "204", a decision is effected whether or not the content of the register T is fifteen. In this case, the register T is processed by interruption at the CPU 11 and its content is increased one at every 0.5 second. Then, if its content is not fifteen, an advance is made to the step "218".

Next, at the step "218" a decision is carried out whether or not the content of the register A is fifteen (15). In this case, the register A is similarly processed by interruption at the CPU 11 so that the content is increased one at every 0.5 second and also reset to eleven (11) at every detection of CTL pulses.

Then, when the content of the register A is not fifteen, an advance is made to the step "11" of FIG. 3. When the content of the register A is fifteen, a decision is performed at step "232" whether or not the search stop flag $F_5$ is one, and when the flag $F_5$ is zero, the flow is advanced to the step "11" of FIG. 3. On the other hand, when the flag $F_5$ is one, at step "233" the value of the CTL counter 58 is replaced by currently reproduced end segment data and an advance is made to step "234". When the content of the register T is fifteen at the step "204" and also the VTR 5 is in its fast forward mode at the step "230", the both flows are advanced to the step "234", respectively.

Then, at this step "234" the VTR 5 is turned to its stop mode and the search on flag $F_{11}$ is turned to zero. Also, at step "235" the search stop flag $F_5$ is turned to zero and the top flag $F_7$ is turned to one.

Further, at step "236" a decision is carried out whether or not the cue search flag $F_6$ or interruption search flag $F_8$ is one. When either one of the flags $F_6$, $F_8$ is one, at step "237" the cue search flag $F_6$ and interruption search flag $F_8$ are both turned to zero and an advance is made to step "238".

When both of the flags $F_6$ and $F_8$ are zero, at step "239" the numeral value of the program pointer 54 is increased by one, and further at step "240" a decision is carried out whether or not the numeral value of the pointer 54 is eight. If it is not eight, an advance is made to the step "238". But, if it is eight, at step "241" the numeral value of the pointer 54 is turned to zero, and at step "242" a decision is carried out whether or not the repeat flag $F_4$ is one. When the flag $F_4$ is one, an advance is made to the step "238".

A decision is carried out at the step "238" whether or not the timer play flag $F_{10}$ is one, and when it is zero, the flow is returned to the step "218". However, when the flag $F_{10}$ is one, at step "243" the search flag $F_3$ and repeat flag $F_4$ are both turned to zero and the flow is returned to the step "218".

Meanwhile, when the repeat flag $F_4$ is zero at the step "242", there is carried out at step "310" a CLEAR ROUTINE, which will be described later.

Thus, the SEARCH-REPEAT ROUTINE is carried out as described above at the step "200".

Returning to FIG. 3, at the step "11" a decision is carried out whether or not the search key S is pressed. If it is not pressed, an advance is made to step "12". When the search key S is pressed, however, another decision is carried out at step "13" whether or not the cue memory 56 is memorized. Then, when it is memorized, the cue search flag $F_6$ is turned to one at step "14" and the flow is advanced to step "15". When it is recognized at the step "13" that the cue memory 56 is not memorized, a further decision is carried out at step "16" whether or not the interruption memory 57 is memorized. Then, if it is memorized, the interruption search flag $F_8$ is turned to one at step "17" and the flow is advanced to the step "15". When the interruption memory 57 is found not to be memorized at the step "16", an advance is made directly to the step "15".

Then, at the step "15" the search flag $F_3$ is turned to one while the search play flag $F_9$ is turned to zero, and then an advance is made to step "18".

At the step "12", another decision is carried out whether or not the repeat key R is pressed. If it is not pressed, an advance is made to the step "18". However, when the repeat key R is pressed, at step "19" the repeat flag $F_4$ is turned to one while the search play flag $F_9$ is turned to zero, and then an advance is made to the step "18".

At the step "18", a decision is carried out whether or not the clear key CL is pressed. When the clear key CL is not pressed, an advance is made to step "20". However, when the clear key CL is pressed, the clear flag $F_{12}$ is turned to one at step "21" and the flow is returned to the step "6".

Further, at the step "20" a decision is carried out whether or not the clear flag $F_{12}$ is one and when it is zero, an advance is made to step "22". When the flag $F_{12}$ is one, however, the CLEAR ROUTINE is carried out at the step "310".

The CLEAR ROUTINE at the step "310" is programmed as shown by a flow chart of FIG. 6.

That is, at step "311" the clear flag $F_{12}$ is turned to zero. Next, a decision is carried out at step "312" whether or not the cue search flag $F_6$ or interruption search flag $F_8$ is one. When either one of the flags $F_6$, $F_8$ is one, the flow is advanced to step "313", wherein the cue search flag $F_6$ and interruption search flag $F_8$ are both turned to zero, and then the flow is returned to the step "6" of FIG. 3. However, when both of the flags $F_6$ and $F_8$ are zero, at step "314" the search flag $F_3$ and repeat flag $F_4$ are both turned to zero, and at step "315" the timer play flag $F_{10}$ and timer record flag $F_{13}$ are both turned to zero. Further, at step "316" the working register W and register Z are both cleared, and the flow is returned to the step "6" of FIG. 3.

Thus, the clear routine at the step "310" is carried out as described above.

Again, back to FIG. 3, a decision is carried out at the step "22" whether or not the numeral keys (0 to 9) are pressed, and if they are not pressed, the flow is advanced to step "23". When the numeral keys are pressed, a NUMBER REGISTER ROUTINE is carried out at step "320". This NUMBER REGISTER ROUTINE at the step "320" is programmed as shown by a flow chart of FIG. 7.

That is, at step "321" the number of pressed key is stored in the working register W. Number registration is made in a sequential shifting manner from its lowest digit. The content of the working register W is displayed on the numeral display 4a. Further, at step "322" a decision is carried out whether or not the CTL flag $F_2$ is one, and when it is one, a return is made to the step "6" of FIG. 3. However, when the flag $F_2$ is zero, at step "323" a decision is carried out whether or not the registered number is less than the number of segments stored in the segment data memory 51 and the interruption search is possible. When the registered number is correct, the content of the working register W is stored in the interruption memory 57 at step "324" and a return is made to the step "6" of FIG. 3. When the registered number is not correct, an error E is displayed on the numeral display 4a at step "325" and a return is made to the step "6" of FIG. 3.

Thus, the NUMBER REGISTER ROUTINE at the step "320" is carried out as above mentioned.

Next, in FIG. 3, a decision is carried out at the step "23" whether or not the cue key CU is pressed and when not pressed, the flow is advanced to step "24". When the cue key CU is pressed, however, a CUE ROUTINE is carried out at step "330". This CUE ROUTINE at the step "330" is programmed as shown by a flow chart of FIG. 8.

That is, at step "331" a decision is carried out whether or not the search flag $F_3$ or repeat flag $F_4$ is one. Then, when either one of the flags $F_3$ and $F_4$ is one, at step "332" the content of the program pointer 54 is read, and at step "333" segment end data of the program memory 52 at its address designated by the pointer 54 are stored in the cue memory 56 at its end data address. Then, an advance is made to step "334". However, when both of the flags $F_3$, $F_4$ are zero, at step "335" the end data address of the cue memory 56 is made blank and the flow is advanced to the step "334". At this step "334", the count of the CTL counter 58 is stored in the cue memory 56 at its in data address and a return is made to the step "6" of FIG. 3.

Thus, the CUE ROUTINE at the step "330" is carried out as described above.

Further, referring to FIG. 3, a decision is made at the step "24" whether or not the program key PRGM, or the numeral key 7, (which is to be pressed successively after pushing the function key F) is pressed. Hereinafter, such key operation is expressed as F-key→7 key or the like. When the program key PRGM is found not to be pressed, an advance is made to step "25". Meanwhile, if it is pressed, at step "26" the program flag $F_{14}$ is turned to one and a return is made to the step "6".

Next, at the step "25", a decision is carried out whether or not the program flag $F_{14}$ is one, and when it is zero, an advance is made to step "27". However, when the flag $F_{14}$ is one, a PROGRAM ROUTINE is carried out at step "400". This PROGRAM ROUTINE at the step "400" is programmed as shown by a flow chart of FIG. 9.

That is, a decision is carried out at step "401" whether or not any numeral key is pressed, and when no numeral key is pressed, an advance is made to step "402". On the contrary, when a numeral key is pressed, the number in flag $F_{15}$ is turned to one at step "403" and the number of pressed key is stored in the working register W. Then, an advance is made to the step "402".

Further, a decision is carried out at the step "402" whether or not the enter key ENTER (F key→R-key) is pressed. When the enter key is not pressed, an advance is made to step "404", but when the enter key is pressed, a decision is made at step "405" whether or not it is a timer mode. When it is the timer mode, a further decision is made at step "406" whether or not the number in flag $F_{15}$ is one. When the flag $F_{15}$ is one, the content of the working register W is stored in the timer memory 53 at step "407", where the flag $F_{15}$ is turned to zero and then an advance is made to the step "404". Further, at the step "406", when the number in flag $F_{15}$ is zero, at step "408" the content of the timer memory 53 is read by the working register W and displayed on the numeral display 4a. Then, an advance is made to the step "404".

When it is not the timer mode at the step "405", a decision is further carried out at step "409" whether or not the number in flag $F_{15}$ is one. When the flag $F_{15}$ is one, at step "410" data of the segment data memory 51 at its address corresponding to the content of the working register W is stored in the program memory 52 and the number in flag $F_{15}$ is turned to zero. Then, an advance is made to the step "404". When the flag $F_{15}$ is zero at the step "409", the content of the program memory 52 is read by the working register W and displayed on the numeral display 4a at step "411". Then, an advance is made to the step "404".

Next, at the step "404", a decision is carried out whether or not the end key END (F-key→8-key) is pressed, and when it is not pressed, a return is made to the step "6" of FIG. 3. However, when the end key is pressed, the program flag $F_{14}$ is turned to zero at step "412" and then a return is made to the step "6" of FIG. 3.

Thus, the PROGRAM ROUTINE at the step "400" is carried out as mentioned above.

Referring to FIG. 3, at the step "27" a decision is carried out whether or not the pause key PAUSE is pressed. When the pause key is not pressed, an advance is made to step "28". When the pause key is pressed, at step "29" the pause flag $F_{16}$ is turned to one and an advance is made to the step "28".

At the step "28", a decision is carried out whether or not the pause flag $F_{16}$ is one. When the flag $F_{16}$ is zero, an advance is made to step "30", but when it is one, a PAUSE ROUTINE is carried out at step "500". This PAUSE ROUTINE at the step "500" is programmed as shown by a flow chart of FIG. 10.

That is, a decision is carried out at step "501" whether or not the VTR 5 is in its stop mode. When it is in the stop mode, an advance is made to step "501", but when it is not in the stop mode, another decision is carried out at step "503" whether or not the VTR 5 is in its playback mode. When it is in the playback mode, an advance is made to the step "502". Then, at the step "502" the VTR 5 is turned to its pause mode and the pause flag $F_{16}$ is turned to zero. Then, a return is made to the step "6" of FIG. 3.

When the VTR 5 is not in the playback mode at the step "503", another decision is carried out at step "504" whether or not the search flag $F_3$ or repeat flag $F_4$ is one. When either one of the flags $F_3$ or $F_4$ is one, an advance is made to the step "30" of FIG. 3. However, when the flags $F_3$, $F_4$ are both zero, the pause flag $F_{16}$ is turned to zero at step "505" and then an advance is made to the step "30" of FIG. 3.

Thus, the PAUSE ROUTINE at the step "500" is carried out as described above.

In FIG. 3, a decision is carried out at the step "30" whether or not a tape installed in the VTR 5 is at its top position and when it is not at the top position, an advance is made to step "31". However, when the tape is at its top position, the content of the CTL counter 58 is cleared to zero at step "32" and then an advance is made to the step "31".

Further, at the step "31" a decision is performed whether or not the timer record key T. REC (F-key→3-key) is pressed, and when it is not pressed, an advance is made to step "33". When the timer record key is pressed, however, at step "34" the timer record flag $F_{13}$ is turned to one and then the flow is returned to the step "6". Further, a decision is carried out at the step "33" whether or not the timer record flag $F_{13}$ is one. When the flag $F_{13}$ is zero, an advance is made to step "35", but when it is one, a TIMER RECORD ROUTINE is carried out at step "600". This routine at the step "600" is programmed as shown by a flow chart of FIG. 11.

That is, at step "601" timer data of the timer memory 53 at its address designated by the timer pointer 55 are stored in the working register W, and at step "602∞ counted values of the timer counter 59 are stored in the register Z. Then, at step "603" a decision is carried out whether or not the counter of the working register W is coincident with the content of the register Z, and when not coincident with each other, the flow is returned to the step "6" of FIG. 3. However, when they are coincident with each other, at step "604" the numeral value of the timer pointer 55 is increased by one, and further at step "605" a decision is carried out whether or not the pointer 55 is in an overflow state. When the pointer 55 is in the overflow state, at step "606" the VTR 5 is turned to its stop mode and then the CLEAR ROUTINE at the step "310" is performed.

When the pointer 55 is found not to be in the overflow state at the step "605", a decision is carried out at step "607" whether or not the timer top flag $F_{17}$ is one, and when the flag $F_{17}$ is one, another decision is carried out at step "608" whether or not the timer record flag $F_{13}$ is one. Then, when the flag $F_{13}$ is one, at step "609" the timer top flag $F_{17}$ is turned to zero. Further, at the step "609", the numerical value of timer pointer 55 serves to provide the corresponding numerical value of program pointer 54 and current content of the CTL counter 58 is stored in the program memory 52 at the segment top portion of its address corresponding to the above numerical value of the program pointer 54. Then, at step "610" the VTR 5 is turned to its record mode and then the flow is returned to the step "6" of FIG. 3.

At the step "607", when the timer top flag $F_{17}$ is zero, at step "611" the timer top flag $F_{17}$ is turned to one. Also, the numerical value of the timer pointer 55 serves to provide the corresponding numerical value of the program pointer 54 and current content of the CTL counter 58 is stored in the program memory 52 at the segment end portion of its address corresponding to the above numerical value of program pointer 54. Then, at step "612" the VTR 5 is turned to its stop mode. Further, at step "613" the VTR 5 is turned to its playback mode, and at step "614" a decision is made whether or not two seconds have been passed. The step "614" is repeated until the lapse of two seconds has been detected. Then, at step "615" the VTR 5 is again turned to the stop mode, and the flow is returned to the step "6" of FIG. 3.

When the timer record flag $F_{13}$ is zero at the step "608", the search flag $F_3$ is turned to one at step "616" and the numerical value of the timer pointer 55 is increased by one. Then, at step "617" the VTR 5 is turned to the playback mode and the flow is returned to the step "6" of FIG. 3.

Thus, the TIMER RECORD ROUTINE at the step "600" is carried out as above described.

Back to FIG. 3 again, a decision is carried out at the step "35" whether or not the timer play key T.PLAY (F-key→1-key) is pressed, and when not pressed, an advance is made to step "36". When the timer play key is pressed, at step "37" the timer play flag $F_{10}$ is turned to one and then the flow is returned to the step "6".

At the step "36", a decision is performed whether or not the timer play flag $F_{10}$ is one, and when it is zero, an advance is made to step "38". However, when the flag $F_{10}$ is one, a TIMER PLAY ROUTINE is carried out at step "700".

The TIMER PLAY ROUTINE at the step "700" is programmed as shown by a flow chart of FIG. 12. That is, at step "701" a decision is carried out whether or not the search on flag $F_{11}$ is one. When the flag $F_{11}$ is zero, at step "702" the search on flag $F_{11}$ is turned to one and the search flag $F_{13}$ is turned to one. Then, the flow is returned to the step "6" of FIG. 3.

However, when the flag $F_{11}$ is one, a decision is carried out at step "703" whether or not the search flag $F_3$ is one, and when the flag $F_3$ is one, the flow is returned to the step "6" of FIG. 3. When the flag $F_3$ is zero, the TIMER RECORD ROUTINE is carried out at step "600".

Thus, the TIMER PLAY ROUTINE at the step "700" is carried out as described above.

Further, back to FIG. 3, at the step "38" a decision is carried out whether or not the data write key WRITE (F-key→9-key) is pressed, and when not pressed, an advance is made to step "39". When the data write key is pressed, a DATA WRITE ROUTINE is carried out at step "800".

The DATA WRITE ROUTINE at the step "800" is programmed as shown by a flow chart of FIG. 13. That is, at step "810" the VTR 5 is turned to its rewind mode, and at step "802" a decision is carried out whether or not the tape is at its top position. Then, the step "802" is repeated until the tape comes to its top position. When the tape is at its top position, at step "803" the VTR 5 is turned to its audio recording condition and the content of the segment memory 51 is converted to audio frequency data before being supplied to the audio input terminal of the VTR 5. Next, at step "804" a decision is performed whether or not data writing has been finished, and this step "804" is repeated until the data writing has been finished. On the other hand, when the data writing has been finished, the VTR 5 is turned to its rewind mode at step "805". Next, at step "806" a decision is carried out whether or not the tape is at its top position, and this step "806" is repeated until the tape comes to its top position. Then, when it is at the top position, the VTR 5 is turned to its stop mode at step "807" and then an advance is made to the step "39" of FIG. 3.

Thus, the DATA WRITE ROUTINE at the step "800" is carried out as mentioned above.

Next, at the step "39" a decision is made whether or not the stop key STOP is pressed, and when it is pressed, the VTR 5 is turned to its stop mode at step "40" and then the flow is returned to the step "6". However, when the stop key is not pressed, an advance is made to step "41".

At the step "41" a decision is carried out whether or not the fast-forward key FF is pressed, and when it is pressed, at step "42" the VTR 5 is turned to its fast forward mode and the top flag $F_7$ is turned to zero. Then, the flow is returned to the step "6". When the fast-forward key is pressed, an advance is made to step "43".

At the step "43", a decision is carried out whether or not the rewind key REW is pressed, and when it is pressed, at step "44" the VTR 5 is turned to its rewind mode, and the top flag $F_7$ is turned to one. Then, the flow is returned to the step "6". However, when the rewind key is not pressed, an advance is made to step "45".

At the step "45", a decision is carried out whether or not the play key PLAY is pressed, and when it is pressed, at step "46" the VTR 5 is turned to its play mode, and the top flag $F_7$ is turned to zero. Then, the flow is returned to the step "6". Further, when the play key is not pressed, the flow is returned to the step "6".

Thus, the above mentioned programs are stored in the ROM 12.

Accordingly, at the tape position control apparatus of this invention, when the power switch is turned on, the apparatus is turned to its initial condition at the steps "2" to "5". Normally, the programs are carried out through the main routes A→B, B→C, C→E, and E→A, respectively, shown in FIG. 3.

When the stop key, fast-forward key, rewind key and play key are pressed, they are detected at the steps "39", "41", "43" and "45", respectively, and the VTR 5 is turned to its respective operation modes at the steps "40", "42", "44" and "46".

Further, when the pause key is pressed, it is detected at the step "27", and the pause flag $F_{16}$ is turned to one at the step "29". Then, when the flag $F_{16}=1$ is detected at the step "28", the VTR 5 is turned to the pause mode at the step "500".

In the step "500", the stop mode and play mode of the VTR 5 are detected at the steps "501" and "503", and in these cases only the VTR 5 is turned to the pause mode. When the VTR 5 is in its fast forward mode or rewind mode, at the step "505" the pause flag $F_{16}$ is turned to zero and the VTR 5 is controlled so as not to be its pause mode. Further, at the step "504" the search mode or repeat mode is detected, and in this case, even when the VTR 5 is in the fast forward mode or rewind mode, the pause flag $F_{16}$ is kept to be one, and it is turned to the pause mode when the VTR 5 comes to its stop or play mode.

Next, a playback using segment data is carried out as follows:

At first, when the program key PRGM is pressed, it is detected at the step "24" and the program flag $F_{14}$ is turned to one at the step "26". Then, when the flag $F_{14}=1$ is detected at the step "25", the program is registered at the step "400".

That is, in the step "400", when any numeral key of a segment number is pressed, it is detected at the step "401", and at the step "403" the number of pressed key is stored in the working register W and also the number in flag $F_{15}$ is turned to one. In addition, when the enter key is pressed, it is detected at the step "402". Thus, at the step "410" data of the segment data memory 51 at its address corresponding to the number registered in the working register W are stored in the program memory 52 and also the number in flag $F_{15}$ is turned to zero. Then, when any numeral key is pressed again, data of corresponding segment are stored in the program memory 52 and as much as eight of segment data can be stored in the program memory 52. Finally, when the end keys is pressed, it is detected at the step "404" and the program flag $F_{14}$ is turned to zero at the step "412". Thus, the segment program is completed.

Under the above condition, when the search key is pressed, it is detected at the step "11", and at the step "15" the search flag $F_3$ and search play flag $F_9$ are respectively turned to one and zero. When the repeat key is pressed, it is detected at the step "12", and at the step "19" the repeat flag $F_4$ and search play flag $F_9$ are respectively turned to one and zero. Then, when the flag $F_3=1$ or $F_4=1$ is detected at the step "8", the playback according to the program memory 52 is carried out at the step "200".

That is, in the step "200", at the initial condition, the top flag $F_7$ is kept to be one, the search stop flag $F_5$ to be zero, and the content of the program pointer 54 to be zero, respectively. Then, at the step "213" the flag $F_7=1$ is detected and at the step "214" the top segment data stored in the program memory 52 at its first address are stored in the working register W.

Further, at the step "202", the counter number of the CTL counter 58 is stored in the register Z, and at the step "216" the count of the CTL counter 58 is compared with the first segment top data. When they are not coincident with each other, at the step "219" the size difference therebetween is detected and at the step "220" or "221" the VTR 5 is turned to the rewind or fast-forward mode so that they may coincide with each other. Further, at the step "232" the search stop flag $F_5=0$ is detected and then the flow is returned to the main route.

When the content of the working register W is coincident with that of the register Z, at the step "222" the top flag $F_7=1$ is detected, and at the step "224" the top flag $F_7$ and search play flag $F_9$ are respectively turned to zero and one. Next, at the step "227" the VTR 5 is turned to the playback mode so that the first segment is reproduced and the flow is returned to the main route.

Since the top flag $F_7$ is kept to be zero under the aforesaid condition, at the step "213" the flag $F_7=0$ is detected and at the step "215" the first segment end data is stored in the register Z, and at the step "216" the content of the register Z is compared with that of the CTL counter 58. When they are not coincident with each other, at the step "217" the search play flag $F_9=1$ is detected and the flow is returned, as it is, to the main route.

When the content of the register Z is coincident with that of the CTL counter 58, at the step "222", the top flag $F_7=0$ is detected, at the step "229" the search play flag $F_9$ is turned to zero, and at the step "231" the search stop flag $F_5$ is turned to one. Then, at the step "232" the flag $F_5=1$ is detected, at the step "234" the VTR 5 is turned to the stop mode, at the step "235" the top flag $F_7$ and search stop flag $F_5$ are respectively turned to one and zero, and at the step "239" the content of the program pointer 54 is increased by one. When the search stop flag $F_5=0$ is detected at the step "232", the flow is returned to the main route.

The above program is repeated. In this case, since the content of the program pointer 54 is increased by one, a segment at the next address of the program memory 52 is reproduced.

If this program is carried out eight times, at the step "239" the content of the program pointer 54 becomes eight. Thus, at the step "240" the content=8 is detected, and at the step "241" the content of the program pointer 54 is turned to zero. In the repeat mode, the above content is detected at the step "242" and the program is repeated from its beginning. In the search mode, however, the operation is cleared at the step "310".

In the step "310", the search flag $F_3$ and the repeat flag $F_4$ are both turned to zero at the step "314" and the content of the working register W and that of the register Z are both turned to zero at the step "316".

In this control apparatus, when the video tape cassette is first not installed, it is detected at the step "6" and the cassette flag $F_1$ is turned to zero at the step "7". When the cassette is installed, it is detected at the step "6". Then, at the step "9" the flag $F_1=0$ is detected, and at the step "10" the flag $F_1$ is turned to one. Thus, at the step "100" the data written on the tape top are read by the segment data memory 51. In this case, the cassette flag $F_1$ is turned to one and hence the step "100" is carried out only once immediately after the cassette is installed.

In the step "100", at the steps "101" and "102" the tape is rewound to its tape top, and at the steps "104" and "105" the data are reproduced and stored in the segment data memory 51. At the steps "108" and "109" the tape is again rewound to its tape top and the VTR 5 is turned to the stop mode at the step "110". Then, the flow is returned to the main route.

When the stop key of the VTR 5 is pressed during its first rewinding, it is detected at the step "103". Then, at the step "111", the VTR 5 is turned to the stop mode and also at the step "112" the CTL flag $F_2$ is turned to one so that the next program may not follow the segmental operation. Thereafter, the flow is returned to the main route.

Next, when the data are wrong or not recorded, the reading of data at the steps "104" and "105" will not be finished even after the lapse of 25 seconds. In this case, it is detected at the step "106" and the CTL flag $F_2$ is turned to one at the step "113". Then, it is returned to the main route.

When the CTL flag $F_2$ is one, the apparatus is in the CTL number control mode, and when some numeral key is pressed at the step "22", the flag $F_2=1$ is detected at the step "322" and the number is kept to be stored in the working register W. Then, when the search key is pressed, the flag $F_2=1$ is detected at the steps "201" and "223", and the stored number is compared with the content of the CTL counter 58 to carry out the access operation.

When the data write key is pressed, it is detected at the step "38", and the content of the segment data memory 51 is recorded on the tape top at the step "800".

That is, in the step "800", at the steps "801" and "802" the tape is rewound to its top position and at the steps "803"]and "804" the data are recorded. Next, at the steps "805" and "806" the tape is again rewound to its top position and the VTR 5 is turned to the stop mode. Then, the flow is returned to the main route.

As described above, if a segment number is designated for each segment, the segment can be accessed. It is also possible that a signal corresponding to each segment data is previously recorded on the tape at its predetermined portion and when the tape is installed, this signal is reproduced and stored in the memory 13 of the control apparatus 1.

Further, in this control apparatus, if the installed tape 70 is provided at the boundary of its segments with a CTL pulse blank of two seconds and more, this blank is detected at the step "218" in the search mode or repeat mode.

In other words, the register A is normally preset to eleven by the CTL pulse and increased by one at every 0.5 second at the blank after passing through the segment end. Then, when the content of the register A becomes fifteen after two seconds, it is detected at the step "218".

In this case, the content of the CTL counter 58 just before the blank of CTL pulse must correctly become the end segment data. However, sometimes dropout or the like makes the numerical value wrong. Thus, at the step "233" the content of the CTL counter 58 is replaced by the end segment data for being compensated for.

Further, when the blank is not detected even with the lapse of 5.5 seconds after passing through the segment end, it is detected at the step "204".

That is, at the step "231" the search stop flag $F_5$ is turned to one and also the content of the register T is preset to four, which is thereafter increased by one at every 0.5 second. Then, when the content of the register T becomes fifteen after the lapse of 5.5 seconds, the flow is advanced to the step "234" without passing through the steps "218", "232" and "233", and the search or repeat program is resumed.

Thus, a segment number is designated for each segment so that the segment can be accessed. Also, a CTL pulse blank of a predetermined length is provided at the segment boundary so that the content of the CTL counter can be corrected by detecting the blank.

Further, in this control apparatus, when the cue key is pressed, it is detected at the step "23" and cue point is registered at the step "330".

That is, in the step "330", when in the search mode or repeat mode, it is detected at the step "331", and the current content of the program pointer 54 is read at the step "332". Then, at the step "333", the segment end data of the program memory 52 at its address designated by the program pointer 54 are stored in the cue memory 56 at its end data address. Next, at the step "334" the currently counted value of the CTL counter 58 is stored in the cue memory 56 at its in data address.

Then, when the search key is pressed after, for example, several pieces of segments are reproduced, it is detected at the step "11", and at the step "13" the memorizing operation of the cue memory 56 is detected. Then, at the step "14" the cue search flag $F_6$ is turned to one, and at the step "15" the search flag $F_3$ and the search play flag $F_9$ are respectively turned to one and zero. Next, at the step "8" the flag $F_3 = 1$ is detected and at the step "200" the cue point is detected.

That is, at the step "205" the cue search flag $F_6 = 1$ is detected, and at the step "207" the in segment data of the cue memory 56 are stored in the working register W. Then, at the step "216" the content of the working register W is compared with the content of the CTL counter 58, and when they are not coincident with each other, at the step "220" or "221" the VTR 5 is turned to the rewind or fast-forward mode so that they may coincide with each other. When they are coincident with each other at the cue point, at the step "224" the top flag $F_7$ and search play flag $F_9$ are respectively turned to zero and one, and at the step "227" the VTR 5 is turned to the playback mode.

Under the above condition, the top flag $F_7 = 0$ is detected at the step "206". Then, the end segment data of the cue memory 56 is stored in the working register W at the step "208" and compared with the content of the CTL counter 58 at the step "216". When they are coincident with each other, at the step "234" the VTR 5 is turned to the stop mode, at the step "236" the cue search flag $F_6 = 1$ is detected, and at the step "237" the flag $F_6$ is turned to zero and the normal search or repeat mode is restored.

In this case, the content of the program pointer 54 is not changed, so that when the search key is pressed, a reproduced segment is accessed.

When the clear key is pressed at a time point where the playback from the cue point is carried out, an advance is made to the step "310". Then, at the step "312" the cue search flag $F_6 = 1$ is detected and at the step "313" the flag $F_6$ is turned to zero. For this reason, it is returned to the normal search or repeat mode and the segment, which has been reproduced when the search key is pressed, is accessed in the same manner as the completion of playback according to the cue memory 56.

Further, when the cue key is pressed at a time not in the search or repeat mode, at the step "335" the end segment data of the cue memory 56 are blanked and at the step "334" only the currently counted value of the CTL counter 58 is stored the cue memory 56 at its top address.

Then, when the search key is pressed at an optical time point, at the step "200" the cue point is accessed, and also at the step "223" the CTL flag $F_2 = 1$ is detected and the search flag $F_3$ is turned to zero.

Thus, according to this invention, if a segment number is designated for each segment, the segment can be accessed. Further, it is possible that a counted value of the CTL pulse at an arbitrary point is stored, this point is also accessed by request in playback, and the initial segment is restored after the segment has been finished.

Further, in the tape position control apparatus, when a numeral key is pressed with the search or repeat mode, it is detected at the step "22", and the interruption segment number is stored at the step "320".

That is, in the step "320", at the step "321" the number of a pressed key is stored in the working register W, and at the step "323" a decision is carried out whether or not the stored number is wrong, that is, the stored segment number is actually present. Then, when the stored segment number is not actually present, at the step "325" the error indication is made until a correct number is stored. When the existing segment number is stored, this number is stored in the interruption memory 57 at the step "324".

When the search key is pressed at an optional time point, it is detected at the step "11". Next, at the step "16" it is detected that the interruption memory 56 is being memorized and at the step "17" the interruption search flag $F_8$ is turned to one. Then, at the step "15" the search flag $F_3$ is turned to one and the search play flag $F_9$ is turned to zero. Meanwhile, at the step "8" the flag $F_3 = 1$ is detected and at the step "200" the interruption search is performed.

That is, at the step "209" the interruption search flag $F_8 = 1$ is detected, and at the step "211" the top segment data of the segment data memory 51 at its address designated by the interruption memory 57 are stored in the working register W. The above data are then compared with the content of the CTL counter 58 at the step "216", and when they are not coincident with each other, at the step "220" or "221" the VTR 5 is turned to the rewind or fast-forward mode so that they may coincide with each other. Next, when they are coincident with each other, at the step "224" the top flag $F_7$ and search play flag $F_9$ are respectively turned to zero and one, and at the step "227" the VTR 5 is turned to the playback mode.

Then, in this mode, at the step "210" the top flag $F_7 = 0$ is detected and the end segment data of the segment data memory 51 at its address designated by the interruption memory 57 are stored in the working register W. Then, they are compared with the content of the CTL counter 58 at the step "216". When they are coincident with each other, at the step "234" the VTR 5 is turned to the stop mode. Then, at the step "236" the interruption search flag $F_8 = 1$ is detected and at the step "237" the flag $F_8$ is turned to zero to restore the normal search or repeat mode.

In this case, the content of the program pointer 54 is not changed, so that the segment reproduced upon pressing the search key is accessed.

At a time point where the playback is carried out according to the interruption search, when the clear key is pressed, an advance is made to the step "310". Then at the "312" the interruption search flag $F_8=1$ is detected and at the step "313" the flag $F_8$ is turned to zero. Therefore, it is restored to the normal search or repeat mode and a segment reproduced upon pressing the search key is accessed in the same manner as the completion of playback according to the cue memory 56.

Thus, if a segment number is designated for each segment, the segment can be accessed. Also, if an arbitrary segment is designated during playback, it is possible that the segment is reproduced and after reproducing, it is restored to the initial segment before being designated.

Further, in this control apparatus, when the fast-forward key is pressed, with the search or repeat mode, it is detected at the step "41", and at the step "42" the VTR 5 is turned to the fast-forward mode and also the top flag $F_7$ is turned to zero. Accordingly, at the step "213" the flag $F_7=0$ is detected, at the step "215" the end segment data are stored in the working register W, and at the step "216" they are compared with the content of the CTL counter 58. When they are coincident with each other, at the step "222" the top flag $F_7=0$ is detected, at the step "230" the fast-forward mode is detected, and at the step "234" the VTR 5 is turned to the stop mode. Further, at the step "239" the program pointer 54 is increased one and a segment at the next address is accessed.

When the rewind key is pressed, it is detected at the step "43". Then, at the step "44" the VTR 5 is turned to the rewind mode and also the top flag $F_7$ is turned to one. Therefore, at the step "213" the flag $F_7=1$ is detected, at the step "214" the top segment data are stored in the working register W, and they are compared with the content of the CTL counter 58 at the step "216". When they are coincident with each other, it is detected at the step "216". Then, at the step "222" the top flag $F_7=1$ is detected, and at the step "227" the VTR 5 is turned to the playback mode.

That is, when the VTR 5 is turned to the fast-forward mode to reach the segment end, the next segment is accessed. Then, when the VTR 5 is returned to the rewind mode to reach the segment top, the playback is effected from the segment top.

In other words, if a number put to each segment is designated, this number can be accessed. Also, with a plurality of segments being designated in an arbitrary order, when the fast-forward key is pressed during the playback of one segment and the segment end is reached, the next segment is accessed and reproduced. Then, when the rewind key is pressed and the segment top is reached, this segment is reproduced from its top position. That is, with the fast-forward key being pressed, the next segment is reproduced, and with the rewind key being pressed, the same segment is repeatedly reproduced.

Further, in this control apparatus, when the timer record is carried out, at first the timer data are stored in the timer memory 53 at the step "400". In other words, when a numeral key representing a desired record starting time (timer data) is pressed, these data are stored in the working register W at the step "403". Then, when the enter key is pressed, the timer mode is detected at the step "405", and at the step "407" the timer data registered in the working register W are stored in the timer memory 53 at its first address. Next, a numeral key representing a desired record finishing time is pressed, the timer data are similarly stored in the timer memory 53 at its second address. Thus, maximum sixteen pieces, or eight pairs of start-finish, of timer data are stored in the respective addresses of the timer memory 53. When required timer data are stored and then the end key is pressed, the program registration is completed.

Then, when the timer record key is pressed under this condition, it is detected at the step "31", and at the step "34" the timer record flag $F_{13}$ is turned to one. Then, when the flag $F_{13}=1$ is detected at the step "33", the flow is advanced to the step "600".

In the step "600", at the initial condition the content of the timer pointer 55 is kept zero and the timer top flag $F_{17}$ is kept to one. Then, at the step "601" the timer data stored in the timer memory 53 at its first address are stored in the working register W, at the step "602" the content of the timer counter 59 is stored in the register Z, and at the step "603" the timer data stored in the working register W are compared with the content of the timer counter 59. If they are not coincident with each other, the flow is returned to the main route and this comparison is repeated. However, if they are coincident with each other, at the step "604" the content of the timer pointer 55 is increased one. Further, at the step "608" the timer record flag $F_{13}=1$ is detected, and at the step "609" the current content of the CTL counter 58 is stored in the program memory 52 at its first segment top data address and the timer top flag $F_{17}$ is turned to zero. Then, at the step "610" the VTR 5 is turned to the record mode and a return is made to the main route.

Further, since the timer record flag $F_{13}$ is kept to one, an advance is again made to the step "600". Since the content of the timer pointer 55 is increased one this time, at the step "601" the timer data stored in the timer memory 53 at its second address are stored in the working register W and these data are compared with the content of the timer counter 59 at the step "603". If they are coincident with each other, the content of the timer pointer 55 is increased one at the step "604". Then, when at the step "607" the timer top flag $F_{17}=0$ is detected, at the step "611" the current content of the CTL counter 58 is stored in the program memory 52 at its first segment end data address and the timer top flag $F_{17}$ is turned to one. Then, at the step "612" the VTR 5 is turned to the stop mode, and at the steps "613" to "615" the tape is transported for two seconds at no record condition and the flow is returned to the main route.

With this program being repeated, the record and the storing of CTR count values at its top and end are carried out.

Further, if this program is carried out eight times, at the step "604" the content of the timer pointer 55 becomes sixteen and it is detected at the step "605". As a result, at the step "606" the VTR 5 is turned to the stop mode and an advance is made to the step "310". Further, at the step "315" the timer record flag $F_{13}$ is turned to zero.

Thus, the record is carried out within a required time and also the count values of CTL pulse at the top and end of this record are memorized.

Further, in this control apparatus, when the timer play is carried out, at first the timer data are stored in the timer memory 53 at the step "400". That is, when a numeral key representing a desired playback start time (timer data) is pressed, these data are stored in the working register W at the step "403". Then, when the enter key is pressed, at the step "405"—the timer mode is detected, and at the step "407" the timer data designated by the working register W are stored in the timer memory 53. Next, when the enter key is pressed, the second address of the timer memory 53 is blanked. Then, when a numeral key is again pressed, the timer data are similarly stored in the timer memory 53 and maximum eight pieces of timer data are stored in the timer memory 53 at its odd-numbered addresses. Further, when required timer data are stored and thereafter the end key is pressed, the program registration is completed.

Then, when the timer play key is pressed at this condition, it is detected at the step "35", and the timer play flag $F_{10}$ is turned to one at the step "37". Then, when the flag $F_{10}=1$ is detected at the step "36", an advance is made to the step "700", and at the step "702" the search on flag $F_{11}$ and search flag $F_3$ are both turned to one.

Accordingly, at the step "8", the search flag $F_3=1$ is detected and the flow is advanced to the step "200". Then, when a segment at the first address of the program memory 52 is accessed at the step "200", the timer play flag $F_{10}=1$ is detected at the step "225". Then, at the step "228" the VTR 5 is turned to the stop mode at an accessed state and the search flag $F_3$ is turned to zero. Then, the flow is returned to the main route.

The flow is again advanced to the step "700". This time, at the steps "701" and "703" the search on flag $F_{11}=1$ and search flag $F_3=0$ are respectively detected and then the flow is advanced to the step "600".

In this step "600", at the initial condition the content of the timer pointer 55 is kept to zero, and the timer top flag $F_{17}$ is kept to one. Further, in the timer play mode the timer record flag $F_{13}$ is kept to zero. Thus, at the step "601" the timer data stored in the timer memory 53 at its first address are transferred to the working register W, at the step "602" the content of the timer counter 59 is transferred to the register Z, and at the step "603" the timer data are compared with the content of the timer counter 59. When they are not coincident with each other, the flow is returned to the main route and this comparison is repeated every time. However, when they are coincident with each other, the content of the timer pointer 55 is increased by one. Further, when at the step "608" the timer record flag $F_{13}=0$ is detected, at the step "616" the search flag $F_3$ is turned to one and the content of the timer pointer 55 is increased by one. Then, at the step "617" the VTR 5 is turned to the playback mode and the flow is returned to the main route.

Then, when the playback is made to the segment end in the same manner as the aforesaid search mode, at the step "234" the search on flag $F_{11}$ is turned to zero to turn the VTR 5 to its stop mode, and at the step "239" the content of the program pointer 54 is increased by one. Further, when at the step "238" the timer play flag $F_{10}=1$ is detected, at the step "243" the search flag $F_3$ and repeat flag $F_4$ are both made to zero and the flow is returned to the main route.

This program is repeated. Since the content of the program pointer 54 is increased by one and the content of the timer pointer 55 is increased by two, a segment at the second address of the program memory 52 is reproduced at a time which is memorized in the timer memory 53 at its third address.

When this program is carried out eight times, at the step "239" the content of the program pointer 54 becomes eight, which is detected at the step "240" and then an advance is made to the step "310". Next, at the step "315" the timer play flag $F_{10}$ is turned to zero.

Thus, according to this invention, a designated segment is reproduced at a requested time, and after the completion of reproducing, a next designated segment is accessed.

It will be appreciated that while the present invention has been described in terms of programs of operation carried out by a microprocessor, the various steps illustrated in FIGS. 3 to 13 may alternatively be embodied in decision units and operation units which make the required comparisons and perform the required operations in proper sequence. In such an embodiment, FIGS. 3 to 13 represent functional block diagrams of the structure involved.

It will be apparent that many modifications and variations may be effected without departing from the scope of the novel concepts of this invention.

We claim as our invention:
1. A tape position control apparatus for video tape recorders comprising:
    a. tape drive control means for controlling the tape movement of a video tape storing segmented video information installed in a video tape recorder;
    b. means for reproducing pulses in response to control signals recorded on a track on said video tape;
    c. count means for counting the number of said control pulses reproduced from said control signals on a track on said video tape;
    d. segment data memory means for storing data for a segment which is requested, indicating the number of said data control pulses from one end of said video tape at least for each point of segmented video information recorded on said video tape with reference to a segment number corresponding to a segment of the segmented video information;
    e. input means for making a request for at least searching one segment of said segmented video information by generating a segment number;
    f. comparison means connected and responsive to said input means and connected to said segment data memory means and to said count means for comparing the currently counted number stored in said count means with the data for the requested segment;
    g. command signal generating means connected to said tape drive control means for generating command signals and supplying said command signals to said tape drive control means in order to search the requested video information, by controlling said drive means to move said tape; and
    h. segment number memory means connected to said input means and to said command signal generating means for storing a plurality of requested segment numbers supplied by said input means and for controlling said command signal generating means, whereby respective requested video information are searched one after another in accordance with the requested order in which said segment numbers are stored.

2. A tape position control apparatus for video tape recorders comprising:
   a. tape drive control means for controlling the tape movement of a video tape storing segmented video information installed in a video tape recorder;
   b. means for reproducing pulses in response to control signals recorded on a track on said video tape;
   c. count means for counting the number of said control pulses reproduced from said control signals on a track on said video tape;
   d. segment data memory means for storing data indicating the number of control pulses from said video tape at least for each point of segmented video information recorded on said video tape with reference to a segment number corresponding to a segment of the segmented video information;
   e. input means for making a request for at least searching one segment of said segmented video information by generating a segment number;
   f. comparison means connected and responsive to said input means and connected to said segment data memory means and to said count means for comparing the currently counted number stored in said count means with the data for the requested segment;
   g. command signal generating means connected to said tape drive control means and to said input means and to said command signal generating means for generating command signals and supplying said command signals to said tape drive control means in order to search the requested video information, by controlling said drive means to move said tape; and
   h. said control pulses being recorded on said video tape, with separating portions on said tape between segments of said segmented video information, and including means for replacing the number stored in said count means by the segment data stored in said segment data memory means with reference to the particular segment number being searched.

3. A tape position control apparatus for video tape recorders comprising:
   a. tape drive control means for controlling the tape movement of a video tape storing segmented video information installed in a video tape recorder;
   b. means for reproducing pulses in response to control signals recorded on a track on said video tape;
   c. count means for counting the number of said control pulses reproduced from said control signals on a track on said video tape;
   d. segment data memory means for storing data indicating the number of control pulses from said video tape at least for each point of segmented video information recorded on said video tape with reference to a segment number corresponding to a segment of the segmented video information;
   e. input means for making a request for at least searching one segment of said segmented video information by generating a segment number;
   f. comparison means for comparing the currently counted number stored in said count means with the data for the requested segment number;
   g. command signal generating means connected to said tape drive control means for generating command signals and supplying said command signals to said tape drive control means in order to search the requested video information by controlling said drive means to move said tape; and
   h. timer clock means for generating current time data, timer data memory means for storing timer data, said input means having means for generating said timer data, second comparison means for comparing said current time data with said stored timer data, and means connected and responsive to said second comparison means for controlling said tape drive control means to start to advance the video tape from the requested top point of the segmented video information at the particular time stored in said timer data memory means whereby said tape drive control means is controlled by both said command signal generating means and by said second comparison means.

4. A tape position control apparatus for video tape recorders comprising:
   a. tape drive control means for controlling the tape movement of a video tape storing segmented video information installed in a video tape recorder;
   b. means for reproducing control pulses in response to control signals recorded on a track on said video tape;
   c. count means for counting the number of control pulses reproduced from said control signals on a track on said video tape;
   d. segment data memory means for storing data indicating the number of control pulses from said video tape at least for each point of segmented video information recorded on said video tape with reference to a segment number corresponding to a segment of the segmented video information;
   e. input means for making a request for at least searching one segment of said segmented video information by generating a segment number;
   f. comparison means for comparing the currently counted number stored in said count means with the data for the requested segment number;
   g. command signal generating means connected to said tape drive control means for generating command signals and supplying said command signals to said tape drive control means in order to search the requested video information, by controlling said drive means to move said tape; and
   h. segment number memory means connected to said input means for storing a plurality of requested segment numbers generated by said input means, said tape drive control means advancing the video tape at a normal playback speed for the duration of respective segments one after another in accordance with the requested order in which said segment numbers are stored.

5. A tape position control apparatus as claimed in claim 4, wherein said input means includes means for generating a cue command when a cue control is operated, and cue data memory means connected to said input means for storing cue data indicating the currently counted number stored in said count means when a cue command is generated by said input means.

6. A tape position control apparatus as claimed in claim 4, wherein said input means includes means for generating an interruption command, upon operation of a control which interrupts the order of segments for which said tape is advanced to normal playback speed, and interruption data memory means connected to said input means for storing interruption data indicating the current segment number when the interruption command is generated by said input means.

* * * * *